United States Patent [19]

Marcoux

[11] 4,419,564
[45] Dec. 6, 1983

[54] SELF-REGULATING ELECTRIC HEATER FOR USE IN AN EARLY FUEL EVAPORATION SYSTEM

[75] Inventor: Leo Marcoux, Rehoboth, Mass.

[73] Assignee: Texas Instruments Incorporated, Dallas, Tex.

[21] Appl. No.: 248,773

[22] Filed: Mar. 30, 1981

[51] Int. Cl.³ .................. H05B 3/02; F02M 31/12; H01C 7/02

[52] U.S. Cl. .................. 219/206; 123/548; 123/549; 123/557; 219/275; 219/505; 219/539; 219/540; 219/541; 338/22 R; 338/328

[58] Field of Search .............. 219/206, 207, 205, 504, 219/505, 541, 544, 548, 549, 552, 553, 520, 538, 539, 275; 123/548, 549, 557; 338/22 R, 328

[56] References Cited

U.S. PATENT DOCUMENTS

| | | | |
|---|---|---|---|
| 3,748,439 | 7/1973 | Ting et al. | 219/538 X |
| 3,995,141 | 11/1976 | Vieau et al. | 219/441 X |
| 3,996,447 | 12/1976 | Bouffard et al. | 219/540 X |
| 4,121,088 | 10/1978 | Doremus et al. | 219/505 X |
| 4,246,880 | 1/1981 | Henke | 219/206 X |
| 4,325,344 | 4/1982 | Igashira et al. | 123/549 |
| 4,347,826 | 9/1982 | Nomura et al. | 123/549 |
| 4,368,380 | 1/1983 | Igashira et al. | 219/541 X |

Primary Examiner—A. Bartis
Attorney, Agent, or Firm—John A. Haug; James P. McAndrews; Melvin Sharp

[57] ABSTRACT

A self regulating heater for use in an early fuel evaporation (EFE) system for an automotive engine includes a thermally conductive thick metal radiator body having a heat receiving side an opposite side provided with a plurality of heat-disturbing fins for transferring heat to a fuel heating zone. A plurality of self-regulating ceramic electrical resistance having a positive temperature coefficient of resistivity (PTC) each have a first side bonded by an electrically and thermally conductive adhesive to a first side of a thin thermally and electrically conductive metal plate. The plate has a limited portion thereof secured, for example, by a screw, in electrically conductive relation to the radiator body with the opposite side of the thin plate in closely spaced, facing, heat-transfer relation to the heat receiving side of the radiator body. Coil springs engage the opposite side of each of the discs to connect the heater discs in an electric circuit for energizing the discs to supply heat to the radiator body. A thermally conductive filler material is disposed in the space between the opposite side of the plate and the radiator body to enhance heat transfer to the body. A thermally conductive cover cooperates with the body to enclose the heater discs and a thermally conductive, electrically insulating compound fills the space between the cover and body to improve heat transfer from both sides of the discs to the radiator body. The thin plate permits the heater discs to move relative to the radiator body during thermal expansion and contraction of the body.

11 Claims, 5 Drawing Figures

SELF-REGULATING ELECTRIC HEATER FOR USE IN AN EARLY FUEL EVAPORATION SYSTEM

BACKGROUND OF THE INVENTION

The field of this invention is that of electrical heaters and the invention relates more particularly to self-regulating heaters having electrical resistance heater elements of a ceramic material of positive temperature coefficient of resistivity and to early fuel evaporation systems for automotive engines using such heaters.

Early fuel evporation (EFE) systems for automotive engines have electrical heaters heating the air-fuel mixture which passes to the engine during the engine warm-up period to enhance fuel evaporation on a cold day, thereby to assure smooth engine starting or to reduce exhaust pollution emissions. Some heaters comprise thin electrical resistance heater discs of a ceramic material of positive temperature coefficient of resistivity which is adapted to display a sharp increase in resistance when the heater self-heats above a particular transition temperature such as 80°–180° C. Those heater discs are self-regulating in that they display progressively increasing electrical resistance and reduced heat output as the heater temperature increases until the heater temperature stabilizes at a safe level.

In certain well known EFE systems presently in commercial use, the heater includes a metal radiator body of substantial size and thermal conductivity having one heat-transferring side provided with heat-distributing rods or fins. Usually, one flat side of each of the thin ceramic heater discs is secured in electrically and thermally conducting relation to an opposite heat-receiving side of the radiator and the radiator is connected to electrical ground. Electrical terminal means engage the respective opposite sides of the heater discs for electrically connecting the resistance heater discs in parallel relation to each other. In that arrangement, the heater discs are conveniently energized from the battery or generator power source of the automotive engine when the engine is started by closing of the ignition switch and are adapted to effect efficient transfer of heat to the radiator for rapidly heating the air-fuel mixture during cold weather to achieve smooth engine performance during start up while reducing emission of pollutants from the engine exhaust.

However, it is found that, as the radiator body of the heater is subjected to thermal expansion and contraction during repeated heating and cooling of the EFE system, the electrical and thermal bond between the heater discs and the heat-receiving side of the radiator body can be broken resulting in breaking of the heater-energizing circuit. It would be desirable if an economical and efficient means could be provided for electrically and thermally connecting the resistance heater discs to the radiator body and for assuring that such electrical and thermal mounting of the heater discs would be reliably maintained throughout a long service life.

It is an object of this invention to provide a novel and improved self-regulating heater device; to provide such a heater device which is particularly adapted for use in an early fuel evaporation system for an automotive engine; to provide such a heater device which is adapted to furnish a desired heating effect with high heating efficiency; to provide such a heater device having improved reliability for use in an automotive environment; and to provide a novel and improved fuel supply system for an automotive engine utilizing such a heater device.

BRIEF SUMMARY OF THE INVENTION

Briefly described, the novel and improved self-regulating heater device of this invention as used in the novel and improved fuel supply system of this invention includes a thermally conducting metal radiator means of substantial size and thermal conductivity having a first heat-receiving side and a second, opposite side for transferring heat to a zone to be heated. Preferably, the radiator means comprises a cast body of aluminum or other thermally and electrically conductive metal material having a wall extending around the heat-receiving side of the body to form and open-ended chamber, having mounting means such as a flange extending around the rim of the chamber wall, and having a plurality of heat-distributing rods or fins extending from the outer heat-transferring side of the cast body.

A thin plate of a thermally and electrically conductive metal material such as aluminum or the like has a plurality of self-regulating electrical resistance heater discs of a ceramic material of positive temperature of coefficient of resistivity disposed with first disc sides bonded in electrically and thermally conducting relation to a first side of the thin plate. The opposite side of the thin plate is secured in closely spaced, facing, electrically and thermally conducting relation to the inner heat-receiving side of the radiator body. Preferably a thermally conducting filler material such as a silicone grease or the like is disposed between the thin plate and the heat-receiving side of the radiator body and screw means serve to hold the plate in closely spaced, electrically and thermally conducting relation to the radiator body. Electrical terminal means are connected to second, opposite sides of the heater discs for electrically connecting the heater discs in parallel relation to each other to a power source.

In a preferred embodiment of the invention, a thermally conducting metal cover member preferably formed of a thermally conducting material such as aluminum or the like is disposed in the open end of the radiator chamber for cooperating with the radiator in enclosing the heater discs in the chamber. A thermally conducting and electrically insulating filler compound such as silicone grease or the like is also enclosed in the chamber around the heater discs for facilitating the transfer of heat from the heater discs to the cover member and from the heater discs and cover member to the radiator body.

In that arrangement, the heater device is mounted in a fuel supply system for an automobile engine to dispose the heat-transferring side of the radiator means to transfer heat to the air-fuel mixture being furnished to the engine. The radiator member is connected to electrical ground and the terminal means are connected to the power source associated with the automobile engine so that, when the engine is started, the heater discs are electrically energized in parallel relation to each other. The heater discs are easily and economically bonded in secure reliable relation to the thin plate and the plate is then secured in efficient heat-transfer relation to the heat-receiving side of the radiator body. The thin plate permits the heater discs to move relative to the larger radiator body during thermal expansion and contraction of the radiator body as the automotive engine is started and stopped. Thus, the construction assures reliable bonding of the heater discs in thermally and electrically conductive relation to the radiator body through a long service life.

DESCRIPTION OF THE DRAWINGS

Other objects, advantages and details of the novel and improved heaters and fuel supply systems of this invention appear in the following detailed description of preferred embodiments of the invention, the detailed description referring to the drawings in which.

DESCRIPTION OF THE PREFERRED EMBODIMENTS

Figure 1:
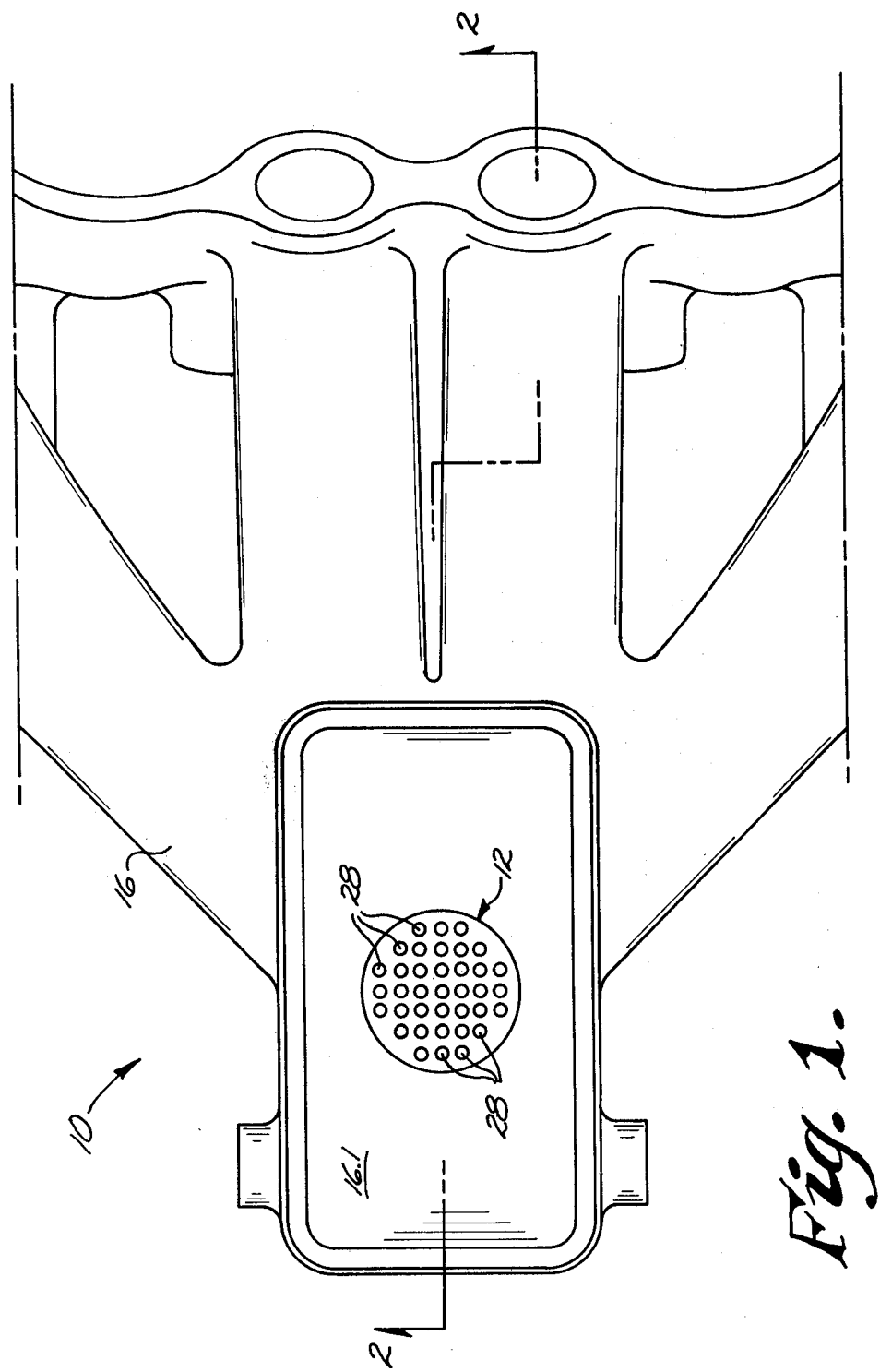
FIG. 1 is a plan view of the self-regulating heater and fuel supply system of this invention diagrammatically showing the heater mounted in an otherwise conventional fuel supply system of an automotive engine.

Referring to the drawings, 10 in FIGS. 1-4 indicates the novel and improved fuel supply system of this invention which is shown to include a novel and improved self-regulating heater device 12 mounted together with the usual components of an otherwise conventional automotive fuel supply system so that the heater is operable to transfer heat to an air-fuel mixture being passed through the system to an automotive engine, thereby to enhance fuel evaporation on a cold day to assure smooth engine starting and/or to reduce the emission of pollutants such as unburned hydrocarbons in the engine exhaust. In a preferred embodiment of this invention for example, the fuel supply system includes carburetor means 14 mounted on an intake manifold means 16 of an automotive engine 18 for supplying an air-fuel mixture to the engine as is diagrammatically indicated in FIG. 2 by the arrow 20. In that arrangement, the heater device 12 is preferably mounted in the bottom wall 16.1 of the manifold beneath the air-fuel supply passage 14.1 of the carburetor so that the air-fuel mixture passes in heat-transfer relation to the heater device 12 as the mixture passes to the engine. As the carburetor, intake manifold and engine means are conventional and as the heater device 12 is disposed in the fuel supply system 10 in a generally conventional location with respect to those conventional components within the scope of this invention, the conventional system components are not further described herein and it will be understood that the system 10 is adapted to supply an air-fuel mixture to the engine to meet engine requirements and the heater device 12 in the system is adapted to transfer heat to the mixture to provide a desired heating effect for improving engine starting and/or for reducing exhaust pollutant emissions from the engine.

In accordance with this invention, the novel and improved heater device 12 comprises a thermally conducting metal radiator means or body 22 or the like having a first heat-receiving side 24 and having a second, opposite, heat-transferring side 26 for transferring heat from the radiator member to a zone 27 to be heated. Preferably, the radiator body comprises a cast unit or the like of aluminum, copper or other thermally conductive metal material having a plurality of heat-distributing rods or fins 28 or the like upstanding from the heat-transferring side of the radiator to enhance heat-transfer from the radiator to the zone 27.

Figure 2:
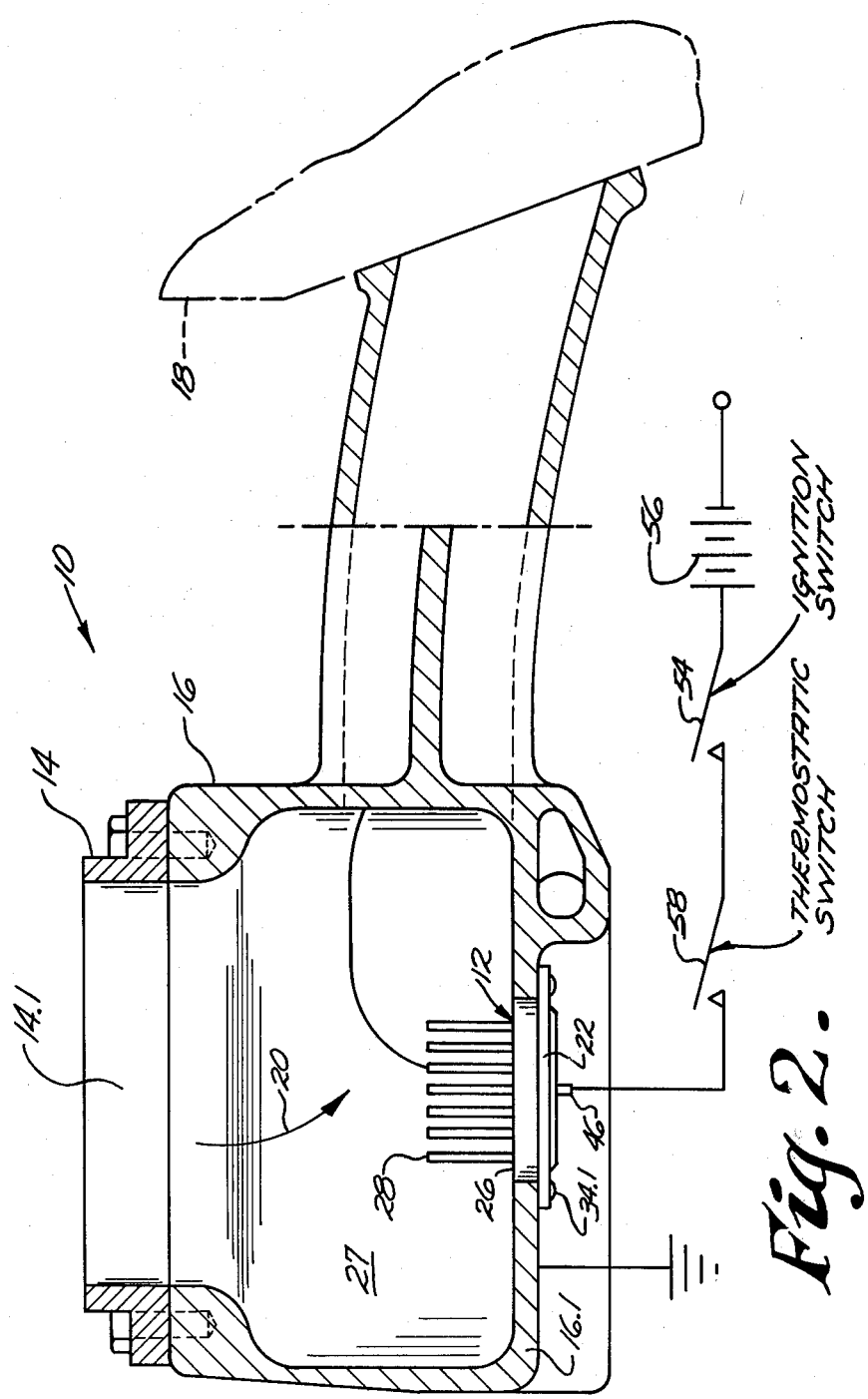
FIG. 2 is a section view along line 2—2 of FIG. 1 schematically illustrating connection of the heater in an electrical circuit in an automobile.

In a preferred embodiment of the invention, the radiator body 22 preferably includes a generally annular wall 30 extending around the heat-receiving side of the radiator to form an open-ended chamber 32. Preferably a flange rim or the like is provided on the wall extending around the rim of the open-chamber for use with the mounting screws 34.1 or the like in mounting the heater device 12 in electrically grounded relation to the engine 18 on the intake manifold 16 as is shown in FIGS. 2 and 3.

Figure 3:
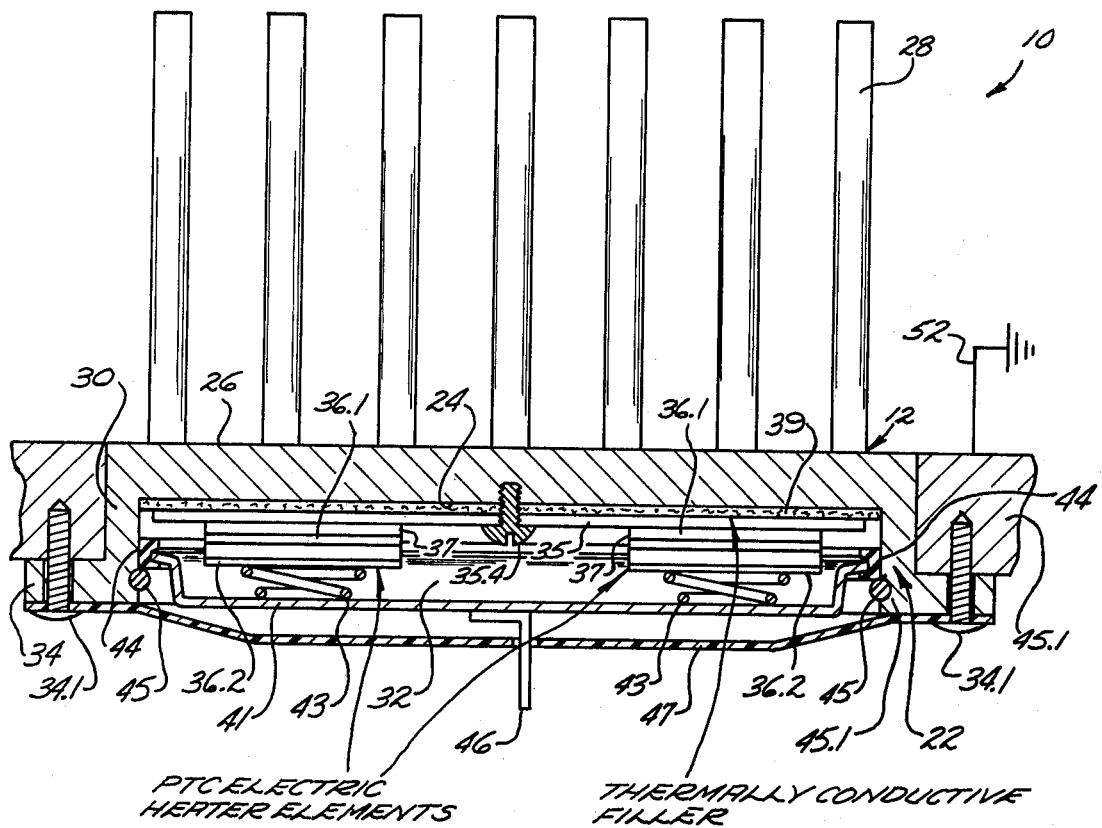
FIG. 3 is a partial section view similar to FIG. 2 to enlarged scale illustrating the components of the heater shown in FIGS. 1 and 2.
Figure 4:
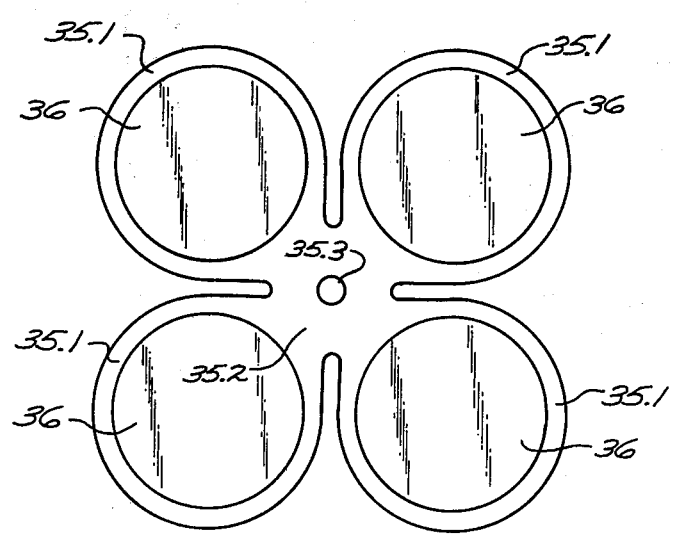
FIG. 4 is a bottom plan view of a component of the heater illustrated in FIG. 3.

In accordance with this invention, a thin plate 35 of a thermally and electrically conducting metal material such as aluminum or the like is proportioned to fit within the chamber 32 as illustrated in FIG. 3. As shown in FIG. 4, the plate is preferably formed with substantially separate sections 35.1 which are slightly spaced from each other along a slit extending between the sections but which are maintained as intregal part of the plate by a central plate portion 35.2 having a central opening 35.3 therein. At least one and preferably a plurality of self-regulating heater elements 36 are disposed as shown in FIG. 3 with first sides 36.1 of the elements bonded by means of a thin layer of a thermally and electrically conducting material 37 such as a conventional solder or silver-filled epoxy material or the like in thermally and electrically conductive relation to a first side of the plate 35 on respective sections 35.1 of the plate 35. The opposite side of the plate is then disposed in closely spaced, facing relation to the heat-receiving side 24 of the radiator member 22 for transferring heat from the first sides of the heater discs 36 to the radiator through the plate. Preferably a thin layer 39 of a thermally conducting filler material such as a conventional silicone-based grease or the like is disposed between the plate and the heat-receiving side of the radiator and screw means 35.4 are fitted through the opening 35.3 in the plate and are threadedly engaged with the radiator body for securing the plate in electrically and thermally conducting relation to the radiator, thereby to connect the first sides of the heater discs to electrical ground through the radiator.

The opposite sides 36.2 of the heater discs are electrically connected to a power source in any conventional manner for electrically energizing the heater discs as will be understood. Preferably for example, a terminal plate 41 has a plurality of helical coil springs 43 of a spiral configuration soldered at one end to the plate 41 as is illustrated in FIG. 3. The plate is mounted inside the open end of the radiator chamber 32 with the opposite ends of the springs 43 resiliently engaging the opposite sides 36.2 of the respective heater discs 36. An insulating ring 44 or the like is fitted around the edge of the terminal plate for electrically insulating the plate from the radiator body while a conventional retaining ring 45 is fitted into a groove 45.1 in the radiator wall 30 to hold the terminal plate in position in the radiator chamber. A lead 46, extending from the terminal plate through a metal or synthetic plastic heat shield 47 or the like clamped to the radiator over the terminal plate in any conventional manner, serves to connect the heater discs to a power source as will be understood. In that arrangement, the heater discs are adapted to be electrically energized in electrically parallel relation to each other.

Figure 5:
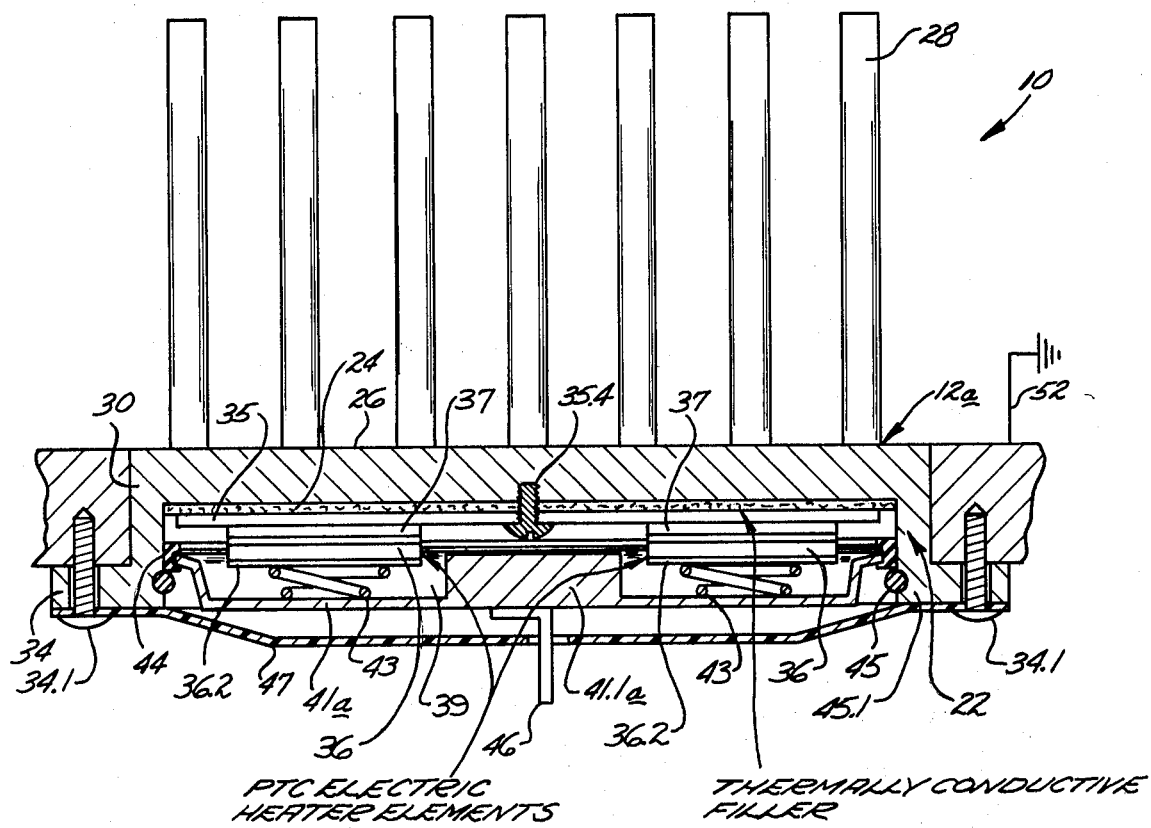
FIG. 5 is a partial section view similar to FIG. 3 illustrating an alternate embodiment of the heater of this invention.

In an alternate embodiment of this invention as shown in FIG. 5, in which corresponding components are identified with corresponding reference numerals, the terminal plate 41a is further provided with portions 41.1a which are disposed in closely spaced facing relation to the heat-receiving side 24 of the radiator body. The entire chamber 32 is then filled with a thermally conducting and electrically insulating filler material such as the silicone-based grease 39 previously described or the like whereby, as is described in the commonly assigned, copending application, Ser. No. 210,955 filed Nov. 28, 1980, heat conducted from the opposite sides 36.2 of the heater discs and to the terminal plate 24a tends to be conducted through the thermally conducting filler material to the heat-receiving side 24 of the radiator body 20 for enhancing heating efficiency of the heater 12a.

In preferred embodiments of this invention for example, each of the heater elements 36 is formed of a thin, disc-shaped body 36.3 of a ceramic, electrical resistance material or the like of a positive temperature coefficient of resistivity having layers of metal provided on the disc sides 36.1 and 36.2 in any conventional manner for providing ohmic electrical contact to the ceramic resistance material. Preferably, the ceramic material comprises an yttrium-doped barium titanate material of any conventional composition having a Curie or transition temperature of 180° C. or the like above which the material displays a sharply increasing electrical resistance with increasing element temperature.

In accordance with this invention, the thermally conducting filler means 39 which is disposed in the radiator chamber 32 comprises a thermally conducting, electrically insulating silicone-based grease or the like. Preferably, the filler compound includes any of the various silicone materials such as dymethyl silicone or other methyl-alkyl silicones or the like which are chemically innert with respect to the ceramic materials embodied in the heater elements 36 and which are stable and preferably shaped-retaining in the temperature range from about 100°-180° C. Other thermally conducting electrically insulating compound such as powder materials or the like are also adapted for use in the heater device 12 within the scope of this invention.

In that construction, mounting of the heater device 12 for example on the intake manifold 16 as shown in FIGS. 2 and 3 disposes the heat-transferring side 26 of the radiator member 22 in heat-transfer relation to the zone 27 within the manifold. That mounting also serves to electrically ground the radiator member 22 to the engine as is diagrammatically indicated 52 in FIG. 2. Accordingly, the terminal connector 46 on the heater device is easily connected through the ignition switch 54 or the like to the battery, generator or other power source means of the automobile engine diagrammatically indicated at 56 so that the heater elements 36 are electrically energized in parallel relation to each other whenever operation of the engine 18 is initiated. If desired, a conventional thermostatic switch 58 is incorporated in the noted circuit as is diagrammatically shown in FIG. 2, the thermostatic switch being normally closed when the temperature of the engine 18 is below a selected temperature level but being adapted to open the circuit in response to heating of the engine to its normal operating temperature after engine warm up occurs.

In that arrangement, when the heater elements 36 are first energized as operation of the engine 18 is initiated on a cold day, heat which is generated in the ceramic heater discs 36 is efficiently transferred through the plate 35 and the filler material 39 to the radiator body 20. As a result, the heating device 12 and the fuel supply system 10 provide improved fuel vaporization to enhance engine starting on a cold day. When the engine warms up so that the thermostat 58 opens the heater energizing circuit, or when the engine is subsequently stopped, the heater discs are denergized and the radiator body 20 is permitted to cool. In the heater device of this invention, the plate 35 permits some relative movement to occur between the plate 35 and the relatively massive radiator body 20 during thermal expansion and contraction of the radiator body during such heating and cooling. Accordingly, the heater discs remain reliably bonded to the thin plate 35 during such thermal expansion contraction of the radiator body. If the heater discs initially provide unequal heating effect, the separation of the plate 35 into substantially separate sections permits separate relative movement of the sections to further assure retention of reliable bonding between the heater discs and the plate 35. In that construction, the heater discs are arranged to be reliably connected in electrically and thermally conducting relation to the heater body through a long service life while also serving to provide efficient heat transfer to the radiator body. The heater discs are also adapted to be reliably bonded to the plate 35 in a most economical manner while then permitting the plate 35 with its bonded heaters thereon to be economically mounted within the radiator body 20.

It should be understood that although particular embodiments of the heater device and fuel supply system of this invention have been described above by way of illustrating the invention, many modifications of the described embodimens are possible within the scope of the invention.

I claim:

1. A heater device comprising a cast thermally conducting metal radiator body of substantial size having a first heat-receiving side and having a second, opposite side with a plurality of heat-distributing fin means upstanding therefrom for transferring heat to a zone to be heated, and self-regulating electrical resistance heater means of ceramic material of positive temperature coefficient of resistivity arranged for transferring heat to the heat-receiving side of the radiator body, characterized in that the heater means comprises a thin plate of substantial area of thermally conducting metal having first and second sides, at least one self-regulating electrical resistance heater disc of a ceramic material of positive temperature coefficient of resistivity having one side thereof bonded in electrical and thermally conducting relation to a limited portion of the first side of the thin plate, means securing a limited portion of the thin plate in electrically conductive relation to the radiator body with its second side in closely spaced, facing, heat-transfer relation to the heat-receiving side of the radiator body, and spring means for electrically engaging an opposite side of the at least one to connect the at least one disc in an electrical circuit for energizing the heater means.

2. A heater device as set forth in claim 1 further characterized in that the thin plate is secured directly to the heat-receiving side of the radiator body by electrically conducting attaching means and a thermally conducting filler is disposed in the space between the second plate side and the heat-receiving side of the radiator body for enhancing heat transfer from the plate to the radiator body.

3. A heater device comprising
a thermally conducting metal radiator means having a first heat-receiving side and having a second, opposite side for transferring heat to a zone to be heated, and self-regulating electrical resistance heater means of ceramic material of positive temperature coefficient of resistivity arranged for transferring heat to the heat-receiving side of the radiator means,
characterized in that the heater means comprises
a thin plate of substantial area of thermally conducting metal having first and second sides,
a plurality of self-regulating electrical resistance heater discs of a ceramic material of positive temperature coefficient of resistivity each having one side thereof bonded in electrically and thermally conducting relation to a respective portion of the first side of the thin plate, the thin plate being disposed with its second side in closely spaced, facing, heat-transfer relation to the heat-receiving side of the radiator means,
means for electrically connecting the thin plate to the radiator means, and
means electrically connected to an opposite side of each of the heater discs for electrically connecting the heater discs in electrically parallel relation to each other in an electrical circuit for energizing the heater means, and in that the portions of the thin plate to which the respective heater discs are bonded are substantially separated from each other along substantial edges of the plate portions and are integrally connected along other edges of the plate portions for facilitating limited movement of the plate portions relative to each other while enhancing heat transfer between the respective plate portions.

4. A self-regulating heater device for a system for supplying an air-fuel mixture to an internal combustion engine comprising
a thermally and electrically conducting metal radiator body having a first heat-receiving side and having a second, opposite side for transferring heat to at least one component of the air-fuel mixture,
means mounting the radiator body in the fuel supply system to electrically connect the radiator member to electrical ground and to dispose the second-heat transferring side of the body to heat at least said one component of the air-fuel mixture, and
self-regulating electrical resistance heater means of ceramic material of positive temperature coefficient of resistivity arranged for transfering heat to the heat-receiving side of the radiator body,
characterized in that the heater means comprises
a thin plate of substantial area of thermally conducting metal having first and second sides,
a plurality of self-regulating electrical resistance heater discs of a ceramic material of positive temperature coefficient of resistivity,
thermally and electrically conducting bonding means securing one side of each of the heater discs in thermally and electrically conducting relation to respective portions of the first side of the thin plate,
metal attaching means securing the plate with its second side in closely spaced, facing, electrically and thermally conducting relation to the radiator body,
thermally conducting filler means disposed between the second plate side and the heat-receiving side of the radiator body enhancing heat-transfer to the radiator body, and
spring means electrically connected to the opposite side of each of the heater discs for electrically connecting the heater discs to a power source in electrically parallel relation to each other.

5. A self-regulating heater device as set in claim 4 further characterized in that the attaching means comprise screw means electrically connecting the thin plate to the metal radiator body.

6. A self-regulating heater device as set forth in claim 5 further characterized in that the thin plate has a plurality of integral sections which are substantially separated from each other along edges of the sections and the heater discs are bonded to respective ones of the sections for facilitating relative movement between the plate sections while permitting heat transfer between the plate sections.

7. A self-regulating heater device as set forth in claim 6 further characterized in that the thermally and electrically conducting bonding means comprises a silver-filled epoxy bonding agent.

8. A self-regulating heater device as set forth in claim 6 further characterized in that the thermally and electrically conducting bonding means comprises a solder material.

9. A self-regulating heater device as set forth in claim 6 further characterized in that the spring means comprise a terminal plate and coil spring elements electrically mounted on the plate for resiliently engaging respective opposite sides of the heater discs.

10. A self-regulating heater device as set forth in claim 9 further characterized in that the radiator body and terminal plate cooperate for forming a chamber enclosing the heater discs therein, and the thermally conducting filler compound comprises an electrically insulating silicone-based grease filling the chamber.

11. A fuel system for an internal combustion engine having means supplying an air-fuel mixture to the engine, a cast thermally conducting metal radiator body of substantial size having a first heat-receiving side and having a second, opposite side with a plurality of heat-distributing fin means upstanding therefrom for transferring heat to at least one component of the air-fuel mixture provided by the air-fuel mixture supply means, means mounting the radiator body in the system to dispose the second radiator side to transfer heat to at least said one component of the air-fuel mixture to produce a desired degree of heating thereof, a thin thermally conducting metal plate of substantial area having first and second sides, a plurality of self-regulating electrical resistance heater discs of a ceramic material of positive temperature coefficient of resistivity adapted to display a sharp increase in resistance when heated above a selected transition temperature, the heater discs each having first and second sides with metal contact layers thereon and having the first sides thereof bonded in electrically and thermally conducting heat-transfer relation to respective portions of the first side of the thin plate for transferring heat from the heater discs to the plate, the thin plate having a limited portion thereof secured to the radiator body with its second side in closely spaced facing heat-transfer relation to the heat-receiving side of the radiator body electrically connected to the body to be connected in an electrical circuit, a thermally conducting filler disposed in the space between the second plate side and the heat-receiving side of the radiator body to facilitate the transfer of heat from the plate to the radiator body, and means for electrically connecting the opposite sides of the heater discs to a power source for electrically energizing the heater discs in electrically parallel relation to each other.

* * * * *